US010131166B2

(12) United States Patent
Kanemoto

(10) Patent No.: US 10,131,166 B2
(45) Date of Patent: Nov. 20, 2018

(54) PRINTING APPARATUS

(71) Applicant: SEIKO EPSON CORPORATION, Tokyo (JP)

(72) Inventor: Shuichi Kanemoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/440,426

(22) Filed: Feb. 23, 2017

(65) Prior Publication Data

US 2017/0253061 A1  Sep. 7, 2017

(30) Foreign Application Priority Data

Mar. 1, 2016  (JP) ................. 2016-038650

(51) Int. Cl.
*B41J 29/17* (2006.01)
*B65G 45/18* (2006.01)
*B41J 11/00* (2006.01)
*B41J 2/01* (2006.01)
*B41J 3/407* (2006.01)

(52) U.S. Cl.
CPC ............. *B41J 29/17* (2013.01); *B41J 2/01* (2013.01); *B41J 11/007* (2013.01); *B65G 45/18* (2013.01); *B41J 3/4078* (2013.01)

(58) Field of Classification Search
CPC .................. B65G 45/18; B41J 29/17
See application file for complete search history.

(56) References Cited

U.S. PATENT DOCUMENTS

| 4,742,594 | A | * | 5/1988 | Chen | ................ B43L 21/02 15/221 |
| 2002/0038486 | A1 | * | 4/2002 | Hunger | ............ H01L 21/67046 15/77 |
| 2005/0069339 | A1 | | 3/2005 | Fiore et al. | |
| 2006/0139395 | A1 | * | 6/2006 | Nakashima | .......... B41J 13/0018 347/22 |
| 2014/0285598 | A1 | * | 9/2014 | Momose | ................ B41J 29/17 347/101 |

FOREIGN PATENT DOCUMENTS

| EP | 0579433 A1 | 1/1994 | |
| EP | 3199363 A1 * | 8/2017 | ......... B41J 2/16552 |
| JP | 06-240589 A | 8/1994 | |
| JP | 2005-104153 A | 4/2005 | |

* cited by examiner

*Primary Examiner* — Shelby L Fidler

(57) ABSTRACT

A printing apparatus includes a transport belt which transports a printing medium, a cleaning tank which stores cleaning liquid, a first cleaning brush and a second cleaning brush which are contained in the cleaning tank and clean the transport belt, and a driving motor which drives to rotate the first cleaning brush and the second cleaning brush. The first cleaning brush and the second cleaning brush are driven to be rotated via a plurality of gears which include a driving gear which is provided in the driving motor and driven gears and which are provided in the first cleaning brush and the second cleaning brush.

7 Claims, 10 Drawing Sheets

PRINTING APPARATUS

BACKGROUND

1. Technical Field

The present invention relates to a printing apparatus.

2. Related Art

In the related art, a printing apparatus is known which performs printing a pattern or the like on a surface of fabric such as cotton, silk, wool, chemical fiber, and blend. The printing apparatus which is used for printing includes a medium transport portion which mounts a printing medium on a transport belt which has an endless shape and has an adhesive and transports the printing medium in order to handle fabric which has elasticity as the printing medium. In the printing apparatus, it is necessary to perform cleaning of the transport belt since ink protruding from the printing medium when performing printing on an end portion of the printing medium, ink which has passed through the fabric, fiber which is dropped out of the fabric or the like is attached to the surface of the transport belt. Therefore, for example, in JP-A-6-240589, a printing machine (printing apparatus) which includes a roll brush is disclosed in order to clean an endless belt (transport belt).

In the printing apparatus in JP-A-6-240589, the cleaning brush is rotated by a chain system which transfers the rotational driving force of the motor via a roller chain. However, since the cleaning brush is rotated while being immersed in the cleaning liquid stored in the cleaning tank, the roller chain rotating the cleaning brush is also immersed in the cleaning liquid. In this state, in a case where cleaning of the transport belt is performed over a long period of time, there is a risk of breakage of the roller chain by being generated rust in the roller chain or elongation of the roller chain due to wear. For this reason, it is necessary to periodically stop the printing operation of the printing apparatus and perform maintenance such as exchanging the roller chain, which reduces the production efficiency of the printing apparatus.

SUMMARY

The invention can be realized in the following forms or application examples.

Application Example 1

According to the application example, there is provided a printing apparatus including a transport belt which transports a printing medium; a cleaning tank which stores cleaning liquid; a cleaning brush which is contained in the cleaning tank and cleans the transport belt; and a driving motor which drives to rotate the cleaning brush. The cleaning brush is driven to be rotated via a plurality of gears which include a driving gear which is provided in the driving motor and a driven gear which is provided in the cleaning brush.

According to the present application example, the cleaning brush which is included in the printing apparatus is driven to be rotated via the gears which include the driving gear which is provided in the driving motor and the driven gear which is provided in the cleaning brush. In other words, the cleaning brush according to the present application example is rotated by a gear system which connects the plurality of gears with each other and transfers a rotational driving force with the motor. Since the gear system has high durability against corrosion and wear compared to a chain system in the related art, the number of times of maintenance performed by stopping a printing operation of the printing apparatus and the time required for maintenance can be greatly reduced. Therefore, operation time during which the printing apparatus is operated becomes longer. Therefore, the printing apparatus which improves production efficiency can be provided.

Application Example 2

In the printing apparatus according to the application example, it is preferable that a center shaft of the driven gear be supported at an upper side of a center shaft of a gear meshing with the driven gear in a vertical direction.

According to the application example, the center shaft of the driven gear which is provided in the cleaning brush is supported at the upper side of the center shaft of the gear meshing with the driven gear. In other words, the driven gear meshes with another gear at a position of the lower half than the central shaft. Therefore, since the cleaning brush can be attached to and detached from the upper side while the driven gear is mounted thereon, workability in a case of maintaining the cleaning brush and the driven gear is improved and the time required for maintenance can be shortened.

Application Example 3

In the printing apparatus according to the application example, it is preferable that a plurality of cleaning brushes be provided along a moving direction of the transport belt and an idler gear be provided between the cleaning brushes which are adjacent to each other.

According to the application example, since the idler gear is provided between the cleaning brushes, the rotational driving force of the driving motor can be sequentially transferred to the cleaning brushes which are adjacent to each other via the idler gear.

Application Example 4

In the printing apparatus according to the application example, it is preferable that at least one of the driven gears which are provided in the plurality of cleaning brushes have a different number of teeth from each other.

According to the application example, since the number of teeth of the driven gears which are provided in the cleaning brushes is different from each other, the rotational speed of the cleaning brushes can be made different from each other.

Application Example 5

In the printing apparatus according to the application example, it is preferable that the driven gears of the cleaning brushes which are adjacent to each other be connected via an odd number of idler gears.

According to the application example, the driven gears of the cleaning brushes which are adjacent to each other are connected via the odd number of idler gears. Since the rotational driving force of the driving motor which is transferred to one of the driven gears is transferred to the other one of the driven gears via the odd number of idler gears, the cleaning brushes which are adjacent to each other can be rotated in the same direction.

Application Example 6

In the printing apparatus according to the application example, it is preferable that the driven gears of the cleaning brushes which are adjacent to each other be connected via an even number of idler gears.

According to the application example, the driven gears of the cleaning brushes which are adjacent to each other are connected via the even number of idler gears. Since the rotational driving force of the driving motor which is transferred to one of the driven gears is transferred to the other one of driven gears via the even number of idler gears, the cleaning brushes which are adjacent to each other can be rotated in directions which are opposite to each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described, with reference to drawings. Scales of each layer and each member are different from those of actual layers and actual members since each layer and each member have recognizable extent of sizes in the following drawings.

In addition, X axis, Y axis, and Z axis are illustrated as three axes which are perpendicular to each other for convenience of explanation in FIG. 1, and FIG. 3 to FIG. 10. A distal end side of an arrow which illustrates an axial direction is referred to as "+ side" and a proximal end side thereof is referred to as "− side". In addition, a direction which is parallel to X axis is referred to as "X axis direction", a direction which is parallel to Y axis is referred to as "Y axis direction", and a direction which is parallel to Z axis is referred to as "Z axis direction", in the following.

Embodiment 1

Schematic Configuration of Printing Apparatus

Figure 1:
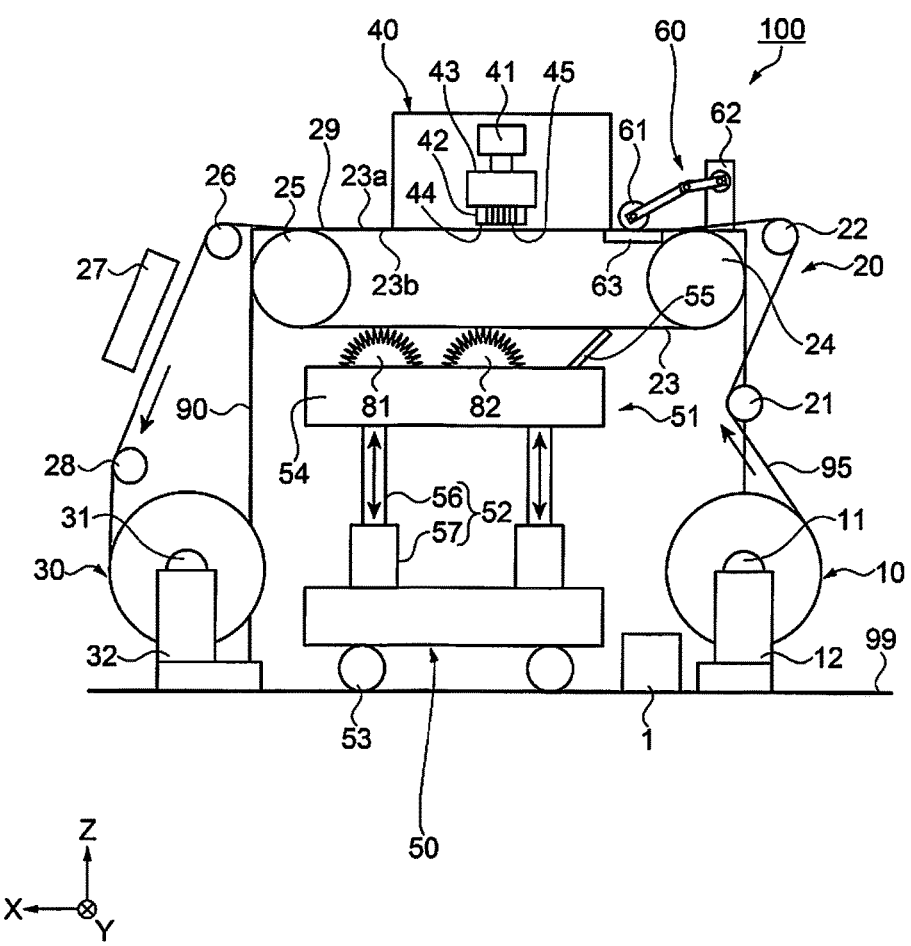
FIG. 1 is a schematic view illustrating overall configuration of a printing apparatus according to Embodiment 1.

FIG. 1 is a schematic view illustrating overall configuration of a printing apparatus according to Embodiment 1. First, with reference to FIG. 1, the schematic configuration of the printing apparatus 100 according to the embodiment will be described. In the embodiment, an ink jet type of a printing apparatus 100 which performs printing on a printing medium 95 by forming an image or the like on the printing medium 95 will be described.

As illustrated in FIG. 1, the printing apparatus 100 includes a medium transport portion 20, a medium close contacting portion 60, a printing portion 40, a drying unit 27, a cleaning unit 50, and the like. The printing apparatus 100 includes a control portion 1 which controls each portion described above. Each portion of the printing apparatus 100 is attached to a frame portion 90.

The medium transport portion 20 transports the printing medium 95 in a transport direction (+X axis direction in the printing portion 40). The medium transport portion 20 includes a medium supplying portion 10, transport rollers 21 and 22, a transport belt 23, a belt rotating roller 24, a belt driving roller 25, transport rollers 26 and 28, and a medium collecting portion 30. First, a transport path of the printing medium 95 leading from the medium supplying portion 10 to the medium collecting portion 30 will be described.

The medium supplying portion 10 supplies the printing medium 95 on which an image is formed to the printing portion 40 side. Fabric such as cotton, wool, and polyester is used as the printing medium 95, as an example. The medium supplying portion 10 includes a supplying shaft portion 11 and a bearing portion 12. The supplying shaft portion 11 has a cylindrical shape or a columnar shape and is provided to be rotatable in a circumferential direction. The printing medium 95 having a strip shape is wound into a roll shape in the supplying shaft portion 11. The supplying shaft portion 11 is detachably attached to the bearing portion 12. Therefore, the printing medium 95 in a state of being wound to the supplying shaft portion 11 in advance is capable of being attached to the bearing portion 12 along with the supplying shaft portion 11.

The bearing portion 12 supports to be rotatable both ends of the supplying shaft portion 11 in an axial direction. The medium supplying portion 10 includes a rotating/driving portion (not illustrated) which rotates and drives the supplying shaft portion 11. The rotating/driving portion rotates the supplying shaft portion 11 in a direction in which the printing medium 95 is delivered. An operation of the rotating/driving portion is controlled by the control portion 1. The transport rollers 21 and 22 relay the printing medium 95 from the medium supplying portion 10 to the transport belt 23.

The transport belt 23 transports the printing medium 95 in the transport direction (+X axial direction). Specifically, the transport belt 23 is formed in an endless shape by connecting both ends of a belt having a strip shape with each other and is hung on the belt rotating roller 24 and the belt driving roller 25. The transport belt 23 is held in a state where a predetermined tension is applied so that a portion between the belt rotating roller 24 and the belt driving roller 25 is parallel to a floor surface 99. An adhesive layer 29 which adheres the printing medium 95 is provided in a surface 23a (supporting surface) of the transport belt 23. The transport belt 23 supports (holds) the printing medium 95 which is supplied from the transport roller 22 and is in close contact with the medium close contacting portion 60 to be described below by the adhesive layer 29. Accordingly, fabric, or the like which has elasticity can be handled as the printing medium 95.

The belt rotating roller 24 and the belt driving roller 25 support an inner peripheral surface 23b of the transport belt 23. A supporting portion which supports the transport belt 23 is configured to be provided between the belt rotating roller 24 and the belt driving roller 25.

The belt driving roller 25 includes a motor (not illustrated) which rotates and drives the belt driving roller 25. When the belt driving roller 25 rotates and drives, the transport belt 23 rotates according to the rotation of the belt driving roller 25, and then the belt rotating roller 24 rotates by the rotation of the transport belt 23. The printing medium 95 which is supported to the transport belt 23 is transported in the predetermined transport direction (+X axial direction) by the rotation of the transport belt 23 and thus an image is formed on the printing medium 95 at the printing portion 40 to be described below.

According to the embodiment, the printing medium 95 is supported on a side (+Z axis side) in which the surface 23a of the transport belt 23 faces the printing portion 40 and the printing medium 95 is transported from the belt rotating roller 24 side to the belt driving roller 25 side (+X axis side) along with the transport belt 23. In addition, only the transport belt 23 moves from the belt driving roller 25 side to the belt rotating roller 24 side (−X axis side) in a side (−Z axis side) in which the surface 23a of the transport belt 23 faces the cleaning unit 50. Although the transport belt 23 is described as including the adhesive layer 29 which is in close contact with the printing medium 95, it is not limited to this. For example, the transport belt may be an electrostatic adsorption type of a transport belt which absorbs the medium to the belt by static electricity.

The transport roller 26 peels off the printing medium 95 on which an image is formed from the adhesive layer 29 of the transport belt 23. The transport rollers 26 and 28 relay the printing medium 95 from the transport belt 23 to the medium collecting portion 30.

The medium collecting portion 30 collects the printing medium 95 which is transported by the medium transport portion 20. The medium collecting portion 30 includes a winding shaft portion 31 and a bearing portion 32. The winding shaft portion 31 has a cylindrical shape or a columnar shape and is provided to be rotatable in a circumferential direction. The printing medium 95 having a strip shape is wound into a roll shape in the winding shaft portion 31. The winding shaft portion 31 is detachably attached to the bearing portion 32. Therefore, the printing medium 95 in a state of being wound to the winding shaft portion 31 is removed along with the winding shaft portion 31.

The bearing portion 32 supports to be rotatable both ends of the winding shaft portion 31 in an axial direction. The medium collecting portion 30 includes a rotating/driving portion (not illustrated) which rotates and drives the winding shaft portion 31. The rotating/driving portion rotates the winding shaft portion 31 in a direction in which the printing medium 95 is wound. An operation of the rotating/driving portion is controlled by the control portion 1.

Next, each portion which is provided along the medium transport portion 20 will be described.

The medium close contacting portion 60 is in close contact between the printing medium 95 and the transport belt 23 with each other. The medium close contacting portion 60 is provided in an upstream (−X axis side) of the printing portion 40. The medium close contacting portion 60 includes a pressing roller 61, a pressing roller driving portion 62 and a roller supporting portion 63. The pressing roller 61 has a cylindrical shape or a columnar shape and is provided to be rotatable in a circumferential direction. The pressing roller 61 is disposed to be intersected between an axial direction thereof and the transport direction with each other in order to rotate in a direction along the transport direction. The roller supporting portion 63 is provided in the inner peripheral surface 23b of the transport belt 23 in a state of facing the pressing roller 61 with the transport belt 23 being inserted between the pressing roller 61 and the roller supporting portion 63.

The pressing roller driving portion 62 moves the pressing roller 61 in the transport direction (+X axis direction) and in a direction (−X axis direction) opposite to the transport direction while pressing the pressing roller 61 in a lower side of the vertical direction (−Z axis side). The printing medium 95 which is overlapped with the transport belt 23 is pressed against the transport belt 23 between the pressing roller 61 and the roller supporting portion 63. Accordingly, the printing medium 95 can be reliably adhered to the adhesive layer 29 which is provided in the surface 23a of the transport belt 23 and can prevent the printing medium 95 from being lifted from the transport belt 23.

The printing portion 40 is disposed on the upper side (+Z axis side) with respect to a disposition position of the transport belt 23. The printing portion 40 includes the discharging head 42 which discharges ink or the like in a droplet shape on the printing medium 95 mounted on the transport belt 23, a carriage 43 on which the discharging head 42 is mounted, and a carriage moving portion 41 which moves the carriage 43 in a width direction (Y axis direction) of the printing medium 95 which is intersected with the transport direction. A nozzle plate 44 on which a plurality of nozzle rows 45 are formed is provided in the discharging head 42. For example, four nozzle rows 45 are formed on the nozzle plate 44. Ink having a different color (for example, cyan: C, magenta: M, yellow: Y, black: K) is discharged per each nozzle row 45. The nozzle plate 44 faces the printing medium 95 which is transported by the transport belt 23.

The carriage moving portion 41 moves the discharging head 42 in a direction (the width direction (Y axis direction) of the printing medium 95) which is intersected with the transport direction of the printing medium 95. The carriage 43 is configured to be supported on a guide rail (not illustrated) which is disposed along Y axis direction and to be capable of reciprocating in the ±Y axis direction by the carriage moving portion 41. Mechanism of a combination of a ball screw and a ball nut, a linear guide mechanism, or the like can be adapted as a mechanism of the carriage moving portion 41, for example.

Further, a motor (not illustrated) as a power source for moving the carriage 43 along Y axis direction is provided in the carriage moving portion 41. When the motor is driven by the control of the control portion 1, the discharging head 42 reciprocates along in the Y axis direction along with the carriage 43. As the discharging head 42, a serial-head type which discharges ink while moving in the width direction (±Y axis direction) of the printing medium 95 which is mounted on the movable carriage is included as an example in the embodiment. However, as the discharging head 42, a line-head type which is disposed to extend in the width direction (Y axis direction) of the printing medium 95 and be fixed may be included.

The drying unit 27 is provided between the transport roller 26 and the transport roller 28. The drying unit 27 dries ink which is discharged on the printing medium 95 and an IR heater is included in the drying unit 27, for example and ink which is discharged on the printing medium 95 can be dried in a short time by driving the IR heater. Accordingly, the printing medium 95 having a strip shape on which an image or the like is formed can be wound around the winding shaft portion 31.

The cleaning unit 50 is disposed between the belt rotating roller 24 and the belt driving roller 25 in the X axis direction. The cleaning unit 50 includes a cleaning portion 51, a pressing portion 52 and a moving portion 53. The moving portion 53 is fixed to a predetermined position by integrally moving the cleaning unit 50 along the floor surface 99.

The pressing portion 52 is a lifting device which is configured as an air cylinder 56 and a ball bushing 57, for example and the cleaning portion 51 which is provided in the upper portion of the pressing portion 52 is in contact with the surface 23a of the transport belt 23. The cleaning portion 51 cleans the surface 23a (supporting surface) of the transport belt 23, from the lower side (−Z axis direction), which is hung in a state where a predetermined tension is applied between the belt rotating roller 24 and the belt driving roller 25 and is moved from the belt driving roller 25 to the belt rotating roller 24.

The cleaning portion 51 cleans the surface 23a of the transport belt 23. The cleaning portion 51 includes a cleaning tank 54 which stores cleaning liquid 59 (see FIG. 4), and cleaning brushes (first cleaning brush 81 and second cleaning brush 82) which are in contact with the transport belt 23 and rotate, a blade 55, and the like.

The blade 55 can be formed of flexible material such as silicon rubber, for example. The blade 55 is provided in a downstream side of the second cleaning brush 82 in the moving direction of the transport belt 23. By sliding of the transport belt 23 and the blade 55, the cleaning liquid 59 attached to the surface 23a of the transport belt 23 is removed by sliding of the first cleaning brush 81 and the second cleaning brush 82. Another configuration of the cleaning portion 51 will be described in detail later.

Electrical Configuration

Figure 2:
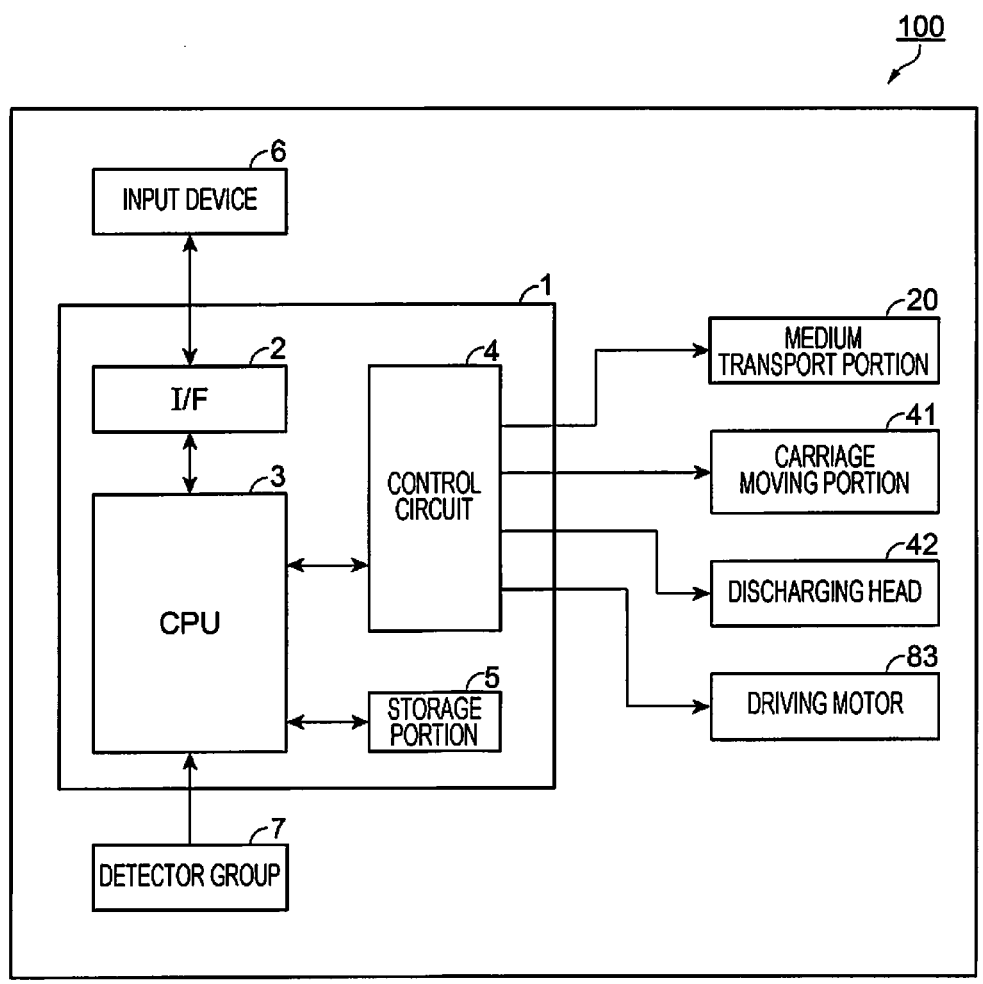
FIG. 2 is an electrical block diagram illustrating electric configuration of the printing apparatus.

FIG. 2 is an electrical block diagram illustrating electric configuration of the printing apparatus. Next, with reference to FIG. 2, the electric configuration of the printing apparatus 100 will be described.

The printing apparatus 100 includes an input device 6 which inputs printing conditions, or the like and a control portion 1 which performs control of each portion of the printing apparatus 100. As the input device 6, Desktop or laptop personal computer (PC), tablet devices, portable devices, or the like can be used. The input device 6 may be provided separately from the printing apparatus 100.

The control portion 1 is configured to include a control circuit 4, an interface portion (I/F) 2, and a central processing unit (CPU) 3, and a storage portion 5. The interface portion 2 performs sending and receiving of data between the input device 6 which handles input signals and images and the control portion 1. The CPU 3 is an arithmetic processing device for performing input signal processing from various detector group 7 and control of entirety of the printing apparatus 100.

The storage portion 5 ensures area for storing program of the CPU 3, working areas, or the like and includes a storage element such as a random access memory (RAM), and an electrically erasable programmable read-only memory (EEPROM).

The control portion 1 outputs control signals from the control circuit 4 and controls driving of various motors included in the medium transport portion 20 and thus moves the printing medium 95 in the transport direction (+X axis direction). The control portion 1 outputs control signals from the control circuit 4 and controls driving of motor included in the carriage moving portion 41 and thus moves the carriage 43 on which the discharging head 42 is mounted in the width direction (Y direction) of the printing medium 95.

The control portion 1 outputs control signals from the control circuit 4 and controls driving of the discharging head 42 and thus discharges ink toward the printing medium 95. The control portion 1 outputs control signals from the control circuit 4 and controls driving of the driving motor 83 and thus rotates the first cleaning brush 81 and the second cleaning brush 82. In addition, the control portion 1 controls each device which is not illustrated.

The control portion 1 forms an image, or the like on the printing medium 95 by repeating main scanning of the carriage 43 (discharging head 42) being moved while ink is discharged from the discharging head 42 by controlling the carriage moving portion 41 and the discharging head 42 and sub scanning of the printing medium 95 being transported in the transport direction by controlling the medium transport portion 20.

Next, with reference to FIG. 3 and FIG. 4, the configuration of the cleaning portion 51 will be described in detail.

Figure 3:
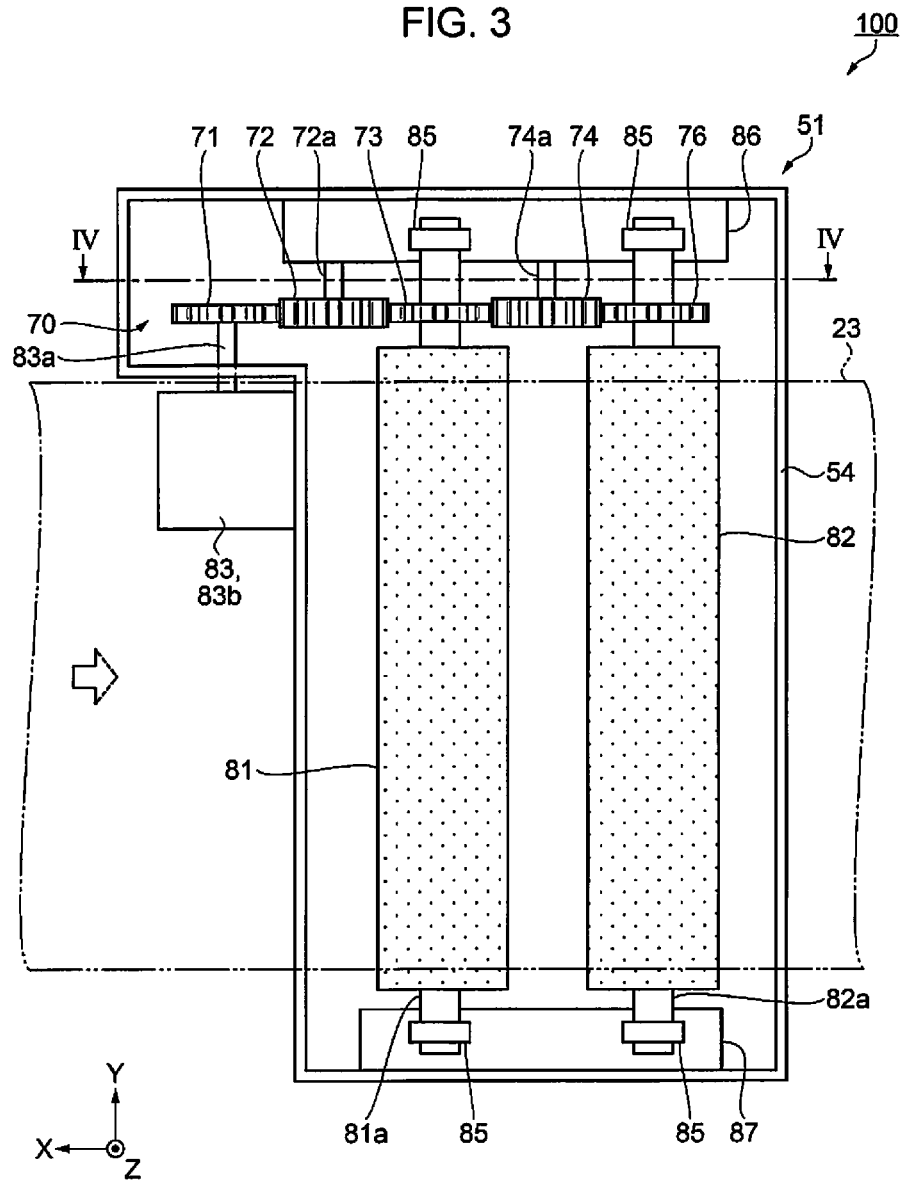
FIG. 3 is a plan view illustrating a configuration of a cleaning portion.

FIG. 3 is a plan view illustrating a configuration of a cleaning portion. FIG. 4 is a cross-sectional view taken along line IV-IV in FIG. 3. In FIG. 3 and FIG. 4, the blade 55 which is included in the cleaning portion 51 is not illustrated. In addition, in FIG. 4, a rotating direction of each of gears 71, 72, 73, 74, and 76 is indicated an arrow.

Figure 4:
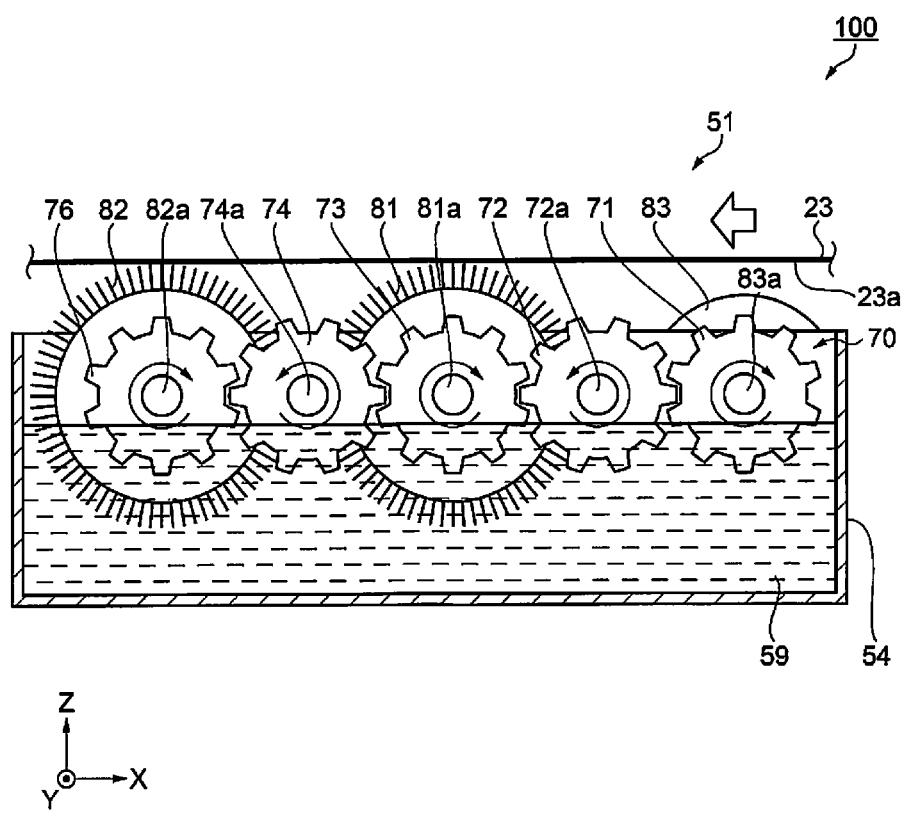
FIG. 4 is a cross-sectional view taken along line IV-IV in FIG. 3.

As shown in FIG. 3 and FIG. 4, the cleaning portion 51 includes the cleaning tank 54, cleaning brushes (first cleaning brush 81 and second cleaning brush 82) contained in the cleaning tank 54 which clean the transport belt 23, a driving motor 83 as a power source which drives and rotates the first cleaning brush 81 and the second cleaning brush 82, a driving connection portion 70 which transfers the rotational driving force of the driving motor 83 to the first cleaning brush 81 and the second cleaning brush 82, and the like.

The cleaning tank 54 is a rectangular parallelelepiped which includes a long side which is longer than the width of the transport belt 23 in a direction (Y axis direction) intersecting with the moving direction (−X axis direction) and is a tank having a concave shape which stores the cleaning liquid 59 for cleaning the surface 23a of the transport belt 23. Support portions 86 and 87 which support the first cleaning brush 81 and the second cleaning brush 82 are provided in the inner wall on a short side (±Y axis side) of the cleaning tank 54. As the cleaning liquid 59, for example, water or water-soluble solvent (such as alcohol aqueous solution) can be used and may be added a surfactant or an antifoaming agent, if necessary.

A plurality of cleaning brushes (first cleaning brush 81 and second cleaning brush 82) are provided in an inside of the cleaning tank 54 along the movement direction (−X axis direction) of the transport belt 23. The first cleaning brush 81 is provided in an upstream side (+X axis side) and the second cleaning brush 82 is provided in a downstream side (−X axis side) in the moving direction (−X axis side) of the transport belt 23. The first cleaning brush 81 and the second cleaning brush 82 are rotating rollers which have widths which are same as the width of the transport belt 23 in a direction (Y axis direction) intersecting with the moving direction (−X axis direction) or have a slightly longer width than the width thereof. The first cleaning brush 81 has a rotating shaft 81a having a columnar shape which extends along the width direction (Y axis direction) of the transport belt 23 and the second cleaning brush 82 has a rotating shaft 82a having a columnar shape which extends along in the width direction (Y axis direction) of the transport belt 23. Both ends of the rotating shafts 81a and 82a in the axis direction are rotatably supported by the support portions 86 and 87 via bearings 85. A lid body (not illustrated) which covers the bearings 85 is provided in the support portions 86 and 87 in order to prevent the first cleaning brush 81 and the second cleaning brush 82 from being lifted.

The driving motor 83 is provided in the outside of the cleaning tank 54. Specifically, the driving motor 83 is provide on an upstream side of the first cleaning brush 81 in the moving direction (−X axis side) of the transport belt 23. The driving shaft 83a of the driving motor 83 extends in the +Y axis side so as to be parallel to the rotating shafts 81a and 82a to each other which project to one end side (+Y axis side in the embodiment) of the first cleaning brush 81 and the second cleaning brush 82. The cleaning tank 54 has an inverse L shape of a portion of the side wall of the +X axis side of the cleaning tank 54 projecting in the +X axis side in the plan view in FIG. 3 so that the main body 83b of the driving motor 83 is provided in the outside of the cleaning tank 54 and thus the distal end of the driving shaft 83a extends in the inner portion of the cleaning tank 54.

The driving connection portion 70 is configured by a plurality of gears which include a driving gear 71 provided in the driving motor 83 and driven gears 73 and 76 provided in the first cleaning brush 81 and the second cleaning brush 82 and first cleaning brush 81 and the second cleaning brush 82 are driven to be rotated via these gears. Specifically, the driving gear 71 is fixed to the driving shaft 83a of the driving motor 83, and rotates via the driving shaft 83a in a case where the driving motor 83 is driven. The driven gear 73 is fixed to the rotating shaft 81a which projects to the +Y axis side of the first cleaning brush 81. In a case where the rotational driving force is transferred to the driven gear 73, the first cleaning brush 81 rotates via the rotating shaft 81a. The driven gear 76 is fixed to a rotating shaft 82a which projects to the +Y axis side of the second cleaning brush 82. In a case where the rotational driving force is transferred to the driven gear 76, the second cleaning brush 82 rotates via the rotating shaft 82a.

A fixed shaft 72a which is fixed to the support portion 86 and extends in the −Y axis direction is provided between the driving shaft 83a of the driving motor 83 and the rotating shaft 81a of the first cleaning brush 81. An idler gear 72 is rotatably provided at a distal end portion of the fixed shaft 72a. The driving gear 71 which is provided in the driving motor 83 and the driven gear 73 which is provided in the first cleaning brush 81 are connected via the idler gear 72.

An idler gear 74 is provided between the cleaning brushes which are adjacent to each other (first cleaning brush 81 and second cleaning brush 82). In addition, the driven gears 73 and 76 of the cleaning brushes (first cleaning brush 81 and second cleaning brush 82) which are adjacent to each other are connected via the odd number (one) of idler gears 74. Specifically, a fixed shaft 74a which is fixed to the support portion 86 and extends in the −Y axis direction is provided between the rotating shaft 81a of the first cleaning brush 81 and the rotating shaft 82a of the second cleaning brush 82. The idler gear 74 is rotatably provided at a distal end portion of the fixed shaft 74a. The driven gear 73 which is provided on the first cleaning brush 81 and the driven gear 76 which is provided on the second cleaning brush 82 are connected via the idler gear 74. Accordingly, since the idler gear 74 is provided between the first cleaning brush 81 and the second cleaning brush 82, the rotational driving force of the driving motor 83 transferred to the first cleaning brush 81 can be transferred to the adjacent second cleaning brush 82 via the idler gear 74.

As a material of the driving gear 71, the driven gears 73 and 76, and the idler gears 72 and 74 which are provided on the driving connection portion 70, a stainless steel which is finished with fluorine processing is adopted. Therefore, rust generation and wear due to immersion in the cleaning liquid 59 over a long period of time can be suppressed.

In the side view from the +Y axis direction illustrated in FIG. 4, for example, in a case where the driving shaft 83a of the driving motor 83 is driven to be rotated in the clockwise direction, the idler gear 72 rotates in the counterclockwise direction, and the driven gear 73 which is connected via the idler gear 72 rotates in the clockwise direction. Further, the idler gear 74 which is connected to the driven gear 73 rotates in the counterclockwise direction, and the driven gear 76 which is connected via the idler gear 74 rotates in the clockwise direction. Accordingly, since the rotational driving force of the driving motor 83 which is transferred to one side of the driven gear 73 is transferred to the other side of the driven gear 76 via the odd number (one) of idler gears 74, the first cleaning brush 81 and the second cleaning brush 82 which are adjacent to each other can be rotated in the same direction.

In a case where the gear system which transfers the rotational driving force by connecting the plurality of gears according to the embodiment is compared to the chain system in the related art which transfers the rotational driving force via a roller chain, the number of times of maintenance performed by stopping the printing operation of the printing apparatus 100 and the time required for maintenance can be greatly reduced since the gear system has high durability against corrosion and wear. In addition, the gear system can be made the driving connection portion 70 smaller than that of the chain system. In addition, the gear system can further reduce the operating noise during cleaning drive than the chain system. In addition, the gear system can prevent incorporation of oil into the cleaning liquid 59 since no grease is required to reduce the friction of the roller chain or to smoothly drive in the chain system in the related art.

Although the embodiment describes the configuration of the driving gear 71 which is provided in the driving motor 83 and the driven gear 73 which is provided in the first cleaning brush 81 being connected via idler gears 72, it is not limited to this. The driving gear 71 and the driven gear 73 may be directly connected to each other or may be connected via a plurality of idler gears. In addition, in the embodiment, although the printing apparatus 100 in which the two cleaning brushes (first cleaning brush 81 and second cleaning brush 82) are included is described as an example, the printing apparatus may include at least three cleaning brush.

In addition, in the present embodiment, although the driven gear 73 of the first cleaning brush 81 and the driven gear 76 of the second cleaning brush 82 are connected via one idler gear 74 as an example, the driven gear 73 of the first cleaning brush 81 and the driven gear 76 of the second cleaning brush 82 may be connected via three or more of odd number of idler gear.

As described above, according to the printing apparatus 100 related to the embodiment, the following effects can be obtained.

The first cleaning brush 81 and the second cleaning brush 82 which are included in the printing apparatus 100 are driven to be rotated via the driving gear 71 which is provided in the driving motor 83, the driven gears 73 and 76 which are provided in the first cleaning brush 81 and the second cleaning brush 82, and the idler gears 72 and 74. Accordingly, in a case where the gear system which transfers the rotational driving force by connecting the plurality of gears is compared to the chain system in the related art which transfers the rotational driving force via a roller chain, the number of times of maintenance performed by stopping the printing operation of the printing apparatus 100 and the time required for maintenance can be greatly reduced, since the gear system has high durability against corrosion and wear. Therefore, operation time during which the printing apparatus 100 is operated becomes longer. Therefore, the printing apparatus 100 which improves production efficiency can be provided.

Since the idler gear 74 is provided between the first cleaning brush 81 and the second cleaning brush 82, the rotational driving force of the driving motor 83 which is transferred to the first cleaning brush 81 can be transferred to the adjacent second cleaning brush 82 via the idler gear 74.

The driven gear 73 which is provided in the first cleaning brush 81 and the driven gear 76 which is provided in the second cleaning brush 82 are connected via the odd number (one) of idler gears 74. According to the configuration, since the rotational driving force of the driving motor 83 which is transferred to the one side of the driven gear 73 is transferred to the other side of the driven gear 76 via the odd number (one) of idler gears 74, the first cleaning brush 81 and the second cleaning brush 82 which are adjacent to each other can be rotated in the same direction.

Embodiment 2

Figure 5:
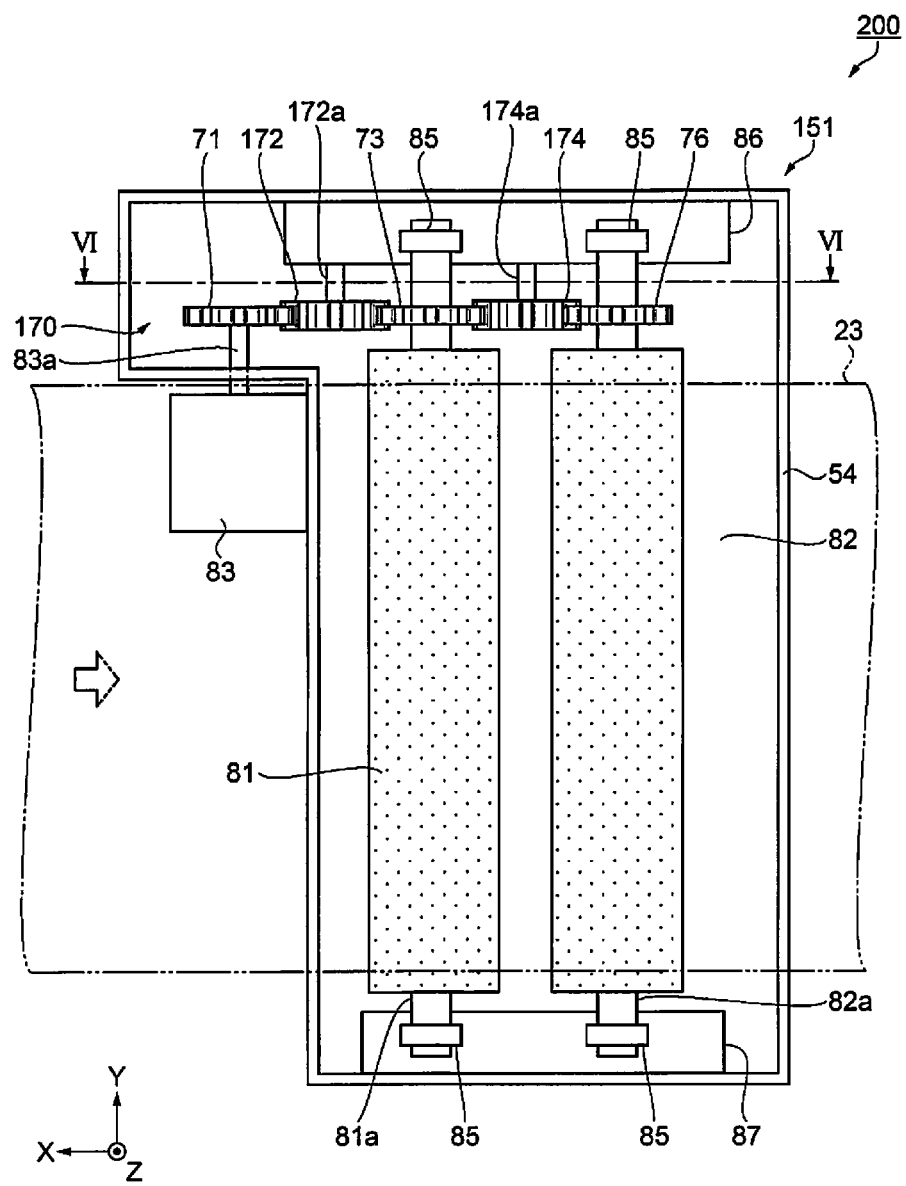
FIG. 5 is a plan view illustrating a configuration of a cleaning portion according to Embodiment 2.
Figure 6:
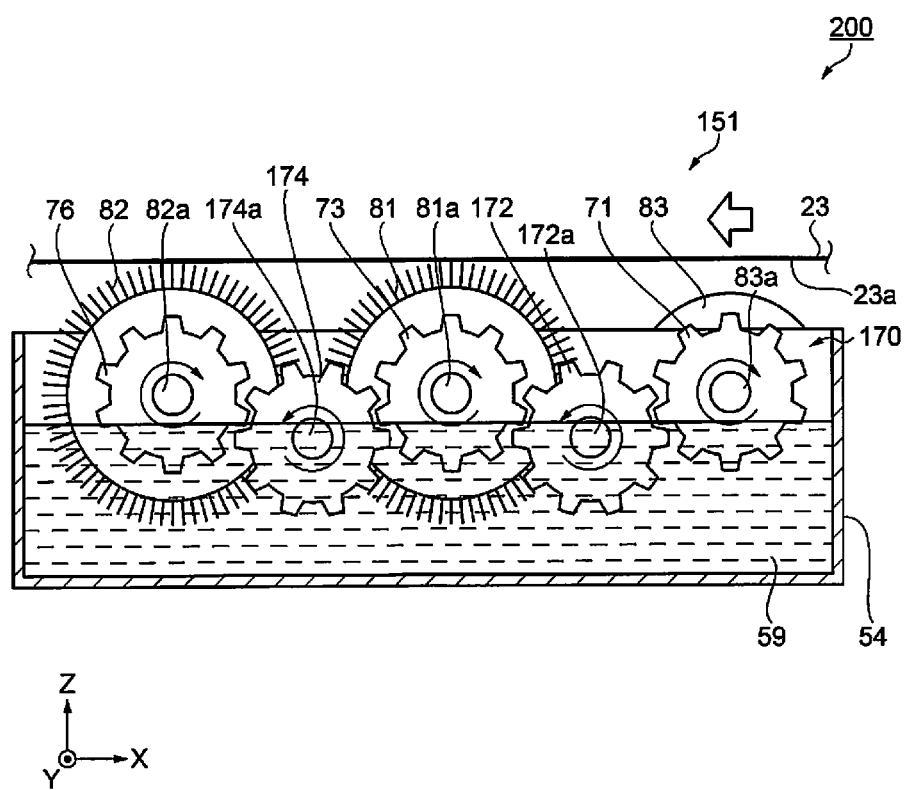
FIG. 6 is a cross-sectional view taken along line VI-VI in FIG. 5.

FIG. 5 is a plan view illustrating a configuration of a cleaning portion according to Embodiment 2. FIG. 6 is a cross-sectional view taken along line VI-VI in FIG. 5. With reference to FIG. 5 and FIG. 6, a printing apparatus 200 of the embodiment will be described. For the same components as in Embodiment 1, the same number is used, and a duplicate description thereof will be omitted. In addition, in FIG. 6, a rotating direction of each of gears 71, 172, 73, 174, and 76 is indicated by an arrow.

As shown in FIG. 5 and FIG. 6, the cleaning portion 151 includes a driving connection portion 170 that transfers the rotational driving force of the driving motor 83 to the first cleaning brush 81 and the second cleaning brush 82.

A fixed shaft 172a which is fixed to the support portion 86 and extends in the −Y axis direction is provided between the driving shaft 83a of the driving motor 83 and the rotating shaft 81a of the first cleaning brush 81. An idler gear 172 is rotatably provided at a distal end portion of the fixed shaft 172a. The driving gear 71 which is provided in the driving motor 83 and the driven gear 73 which is provided in the first cleaning brush 81 are connected via idler gear 172.

A fixed shaft 174a which is fixed to the support portion 86 and extends in the −Y axis direction is provided between the rotating shaft 81a of the first cleaning brush 81 and the rotating shaft 82a of the second cleaning brush 82. An idler gear 174 is rotatably provided at a distal end portion of the fixed shaft 174a. The driven gear 73 which is provided in the first cleaning brush 81 and the driven gear 76 which is provided in the second cleaning brush 82 are connected via the idler gears 174.

Center shafts of the driven gears 73 and 76 are supported at upper sides of center shafts of gears meshing with the driven gears 73 and 76 in a vertical direction. Specifically, the driven gear 73 meshes with two gears which are an idler gear 172 and the idler gear 174. The rotating shaft 81a as the center shaft to which the driven gear 73 is fixed is supported at an upper side of the fixed shafts 172a and 174a in the vertical direction (Z axis direction) as the center shaft in which the idler gears 172 and 174 are provided. In other words, the driven gear 73 and the idler gears 172 and 174 mesh with each other on the lower side (the −Z axis side) of the rotating shaft 81a of the driven gear 73. Accordingly, the first cleaning brush 81 on which the driven gear 73 is mounted can be attached to and detached from the upper side (+Z axis side). Therefore, workability in a case of maintaining the first cleaning brush 81 and the driving connection portion 170 is improved.

The driven gear 76 meshes with the idler gear 174. The rotating shaft 82a as the center shaft to which the driven gear 76 is fixed is supported at an upper side of the fixed shaft 174a in the vertical direction (Z axis direction) as the center axis in which the idler gear 174 is provided. In other words, the driven gear 76 and the idler gear 174 mesh with each other on the lower side (−Z axis side) of the rotating shaft 82a of the driven gear 76. Accordingly, the second cleaning brush 82 on which the driven gear 76 is mounted can be attached to and detached from the upper side (+Z axis side). Therefore, workability in a case of maintaining the second cleaning brush 82 and the driving connection portion 170 is improved.

According to the embodiment, although the driving gear 71 which is provided in the driving motor 83 and the driven gear 73 which is provided in the first cleaning brush 81 are connected via the idler gear 172, it is not limited to this. The driving gear 71 and the driven gear 73 may directly mesh with each other on the lower side (the −Z axis side) of the rotating shaft 81a of the driven gear 73.

In addition, in the embodiment, although the printing apparatus 200 in which the two cleaning brushes (first cleaning brush 81 and second cleaning brush 82) is included are described as an example, the printing apparatus may include one cleaning brush, or the printing apparatus may include at least three cleaning brushes.

As described above, according to the printing apparatus 200 related to the embodiment, the following effects can be obtained.

Since the rotating shafts 81a and 82a of the driven gears 73 and 76 are supported at an upper side of the fixed shafts 172a and 174a of the idler gears 172 and 174 in the vertical direction, the first cleaning brush 81 on which the driven gear 73 is mounted and the second cleaning brush 82 on which the driven gear 76 is mounted can be attached to and detached from the upper side (+Z axis side). Therefore, workability in a case of maintaining the first cleaning brush 81 and the second cleaning brush 82 and the driving connection portion 170 is improved and the time required for maintenance can be shortened.

Embodiment 3

Figure 7:
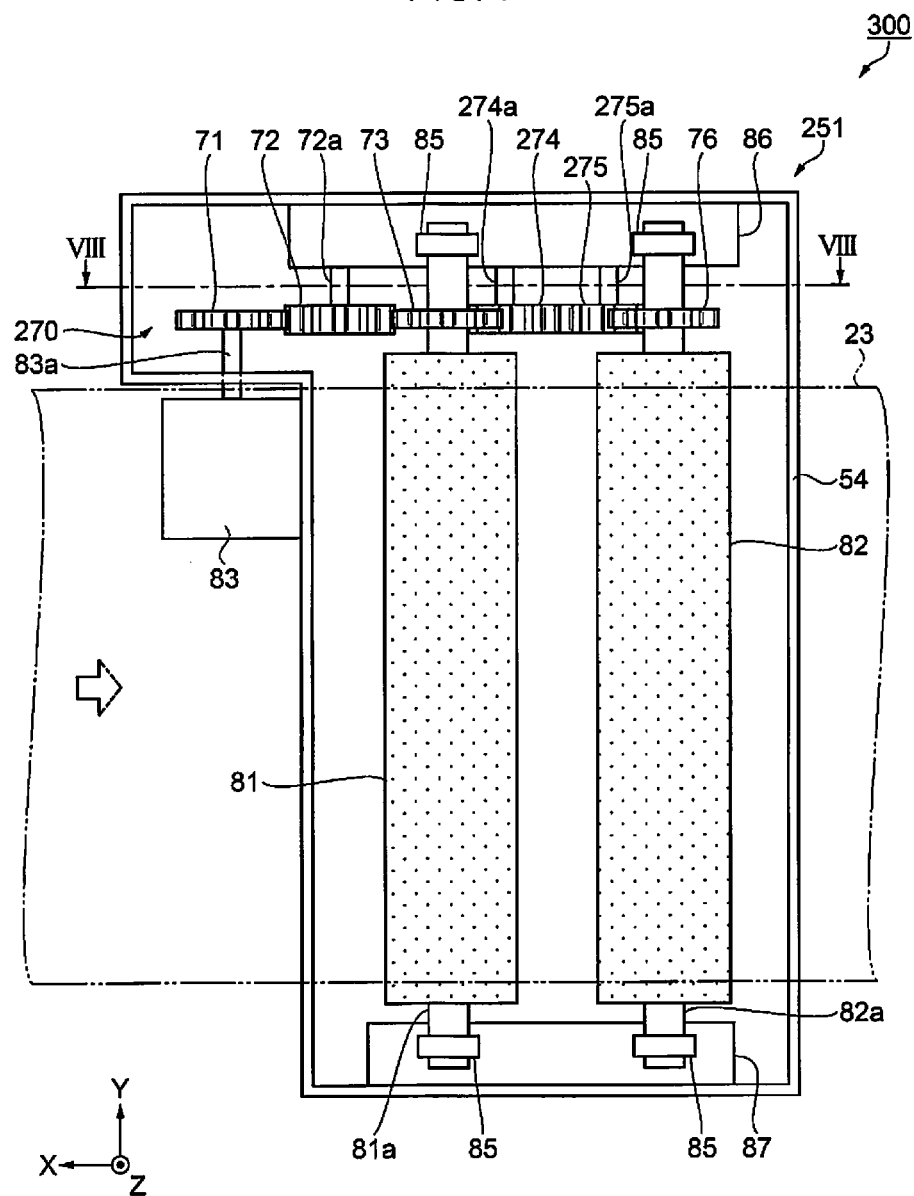
FIG. 7 is a plan view illustrating a configuration of a cleaning portion according to Embodiment 3.
Figure 8:
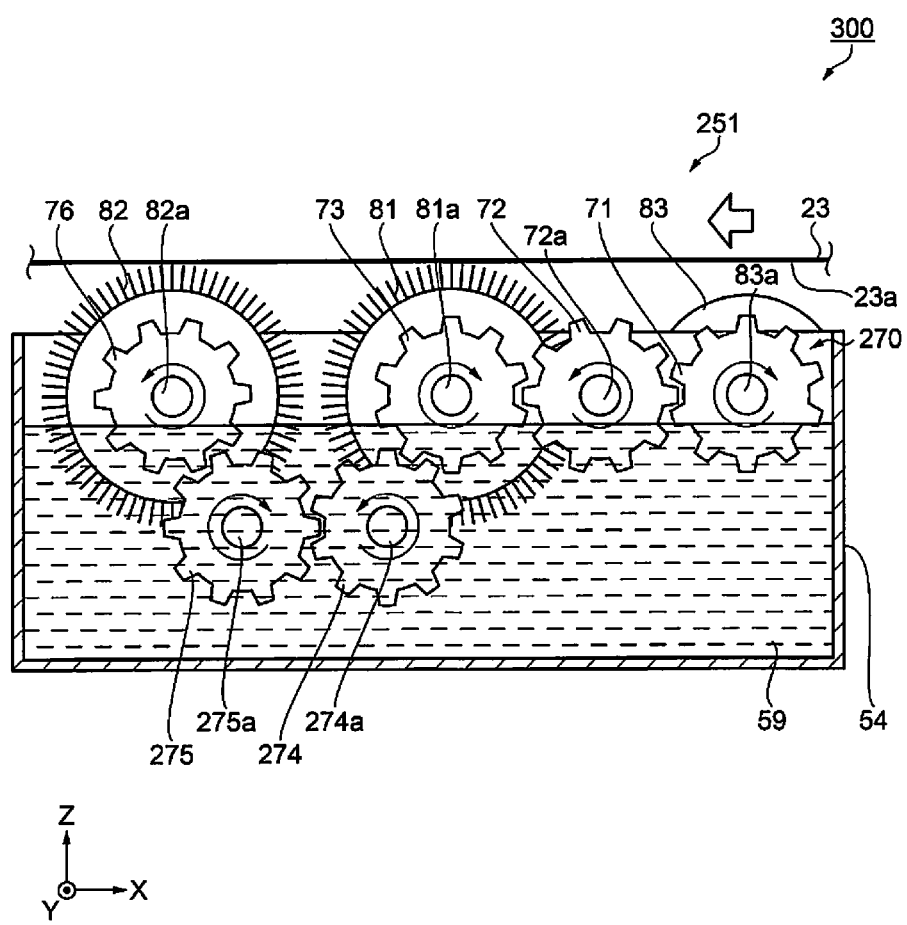
FIG. 8 is a cross-sectional view taken along line VIII-VIII in FIG. 7.

FIG. 7 is a plan view illustrating a configuration of a cleaning portion according to Embodiment 3. FIG. 8 is a cross-sectional view taken along line VIII-VIII in FIG. 7. With reference to FIG. 7 and FIG. 8, a printing apparatus 300 of the embodiment will be described. For the same components as in Embodiment 1, the same number is used, and a duplicate description thereof will be omitted. In addition, in FIG. 8, a rotating direction of each of gears 71, 72, 73, 274, 275, and 76 is indicated by an arrow.

As shown in FIG. 7 and FIG. 8, the cleaning portion 251 includes a driving connection portion 270 that transfers the rotational driving force of the driving motor 83 to the first cleaning brush 81 and the second cleaning brush 82.

The driven gears 73 and 76 of the cleaning brushes (first cleaning brush 81 and second cleaning brush 82) which are adjacent to each other are connected via the even number (two) of idler gears 274 and 275. Specifically, fixed shafts 274a and 275a which are fixed to the support portion 86 and extend in the −Y axis direction are provided between the rotating shaft 81a of the first cleaning brush 81 and the rotating shaft 82a of the second cleaning brush 82. The idler gear 274 is rotatably provided at a distal end portion of the fixed shaft 274a. The idler gear 275 is rotatably provided at a distal end portion of the fixed shaft 275a. The driven gear 73 which is provided in the first cleaning brush 81 and the driven gear 76 which is provided in the second cleaning brush 82 are connected via the idler gears 274 and 275.

In the side view from the +Y axis direction illustrated in FIG. 8, for example, when the driving shaft 83a of the driving motor 83 is driven to be rotated in the clockwise direction, the idler gear 72 rotates in the counterclockwise direction, and the driven gear 73 which is connected via the idler gear 72 rotates in the clockwise direction. Further, the idler gear 274 which is connected to the driven gear 73 rotates in the counterclockwise direction, and the idler gear 275 which is connected to the idler gear 274 rotates in the clockwise direction. The driven gear 76 connected to the idler gear 275 rotates in the counterclockwise direction. Accordingly, since the rotational driving force of the driving motor 83 which is transferred to the one side of the driven gear 73 is transferred to the other side of the driven gear 76 via the even number (two) of idler gears 274 and 275, the first cleaning brush 81 and the second cleaning brush 82 which are adjacent to each other can be rotated in directions which are opposite to each other.

In the embodiment, although the driven gear 73 of the first cleaning brush 81 and the driven gear 76 of the second cleaning brush 82 are connected via the two idler gears 274 and 275 as an example, the driven gear 73 of the first cleaning brush 81 and the driven gear 76 of the second cleaning brush 82 may be connected via four or more of even number of idler gear.

In addition, in the embodiment, although the printing apparatus 300 in which the two cleaning brushes (first cleaning brush 81 and second cleaning brush 82) are included is described as an example, the printing apparatus may include at least three cleaning brushes.

As described above, according to the printing apparatus 300 related to the embodiment, the following effects can be obtained.

Since the driven gear 73 of the first cleaning brush 81 and the driven gear 76 of the second cleaning brush 82 which are adjacent to each other are connected to the two idler gears 274 and 275, the first cleaning brush 81 and the second cleaning brush 82 can be rotated in directions opposite to each other. Accordingly, the transport belt 23 can be suitably cleaned.

Embodiment 4

Figure 9:
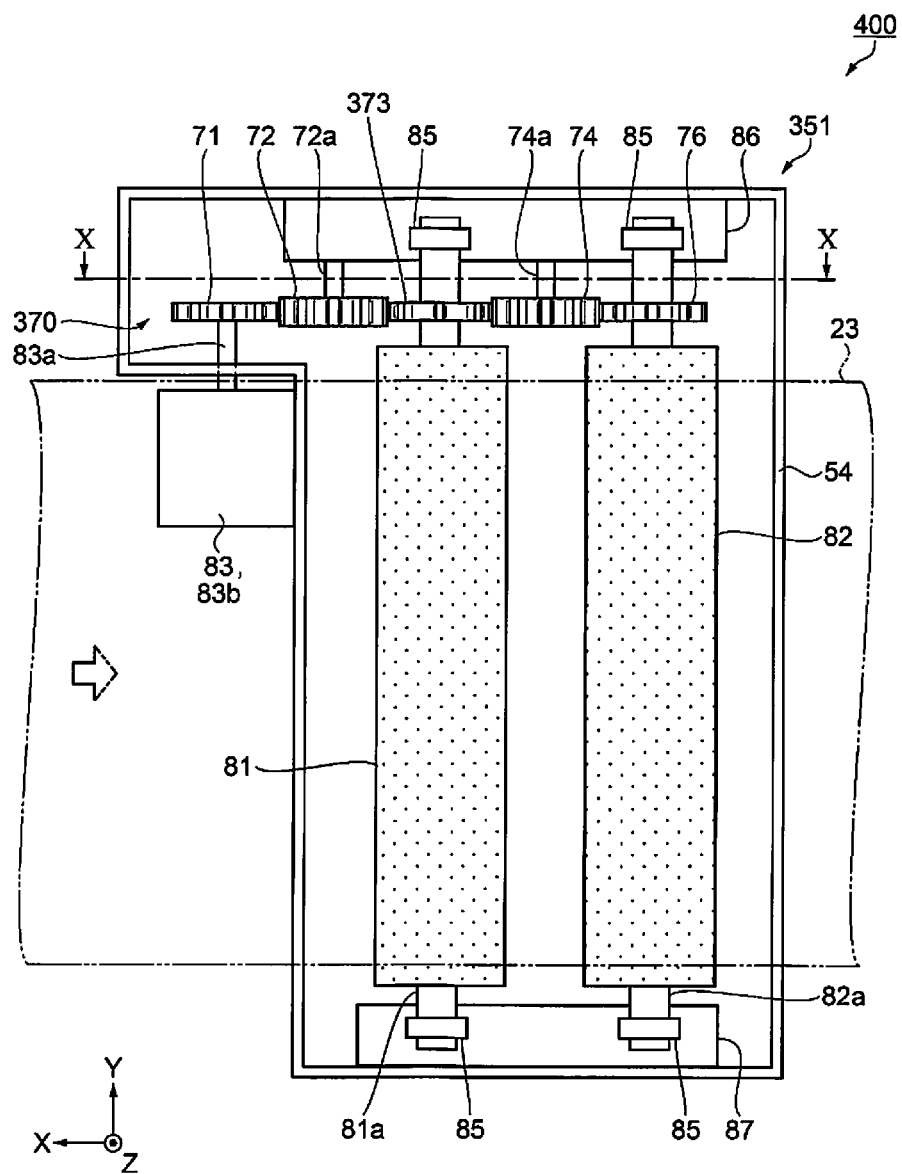
FIG. 9 is a plan view illustrating a configuration of a cleaning portion according to Embodiment 4.
Figure 10:
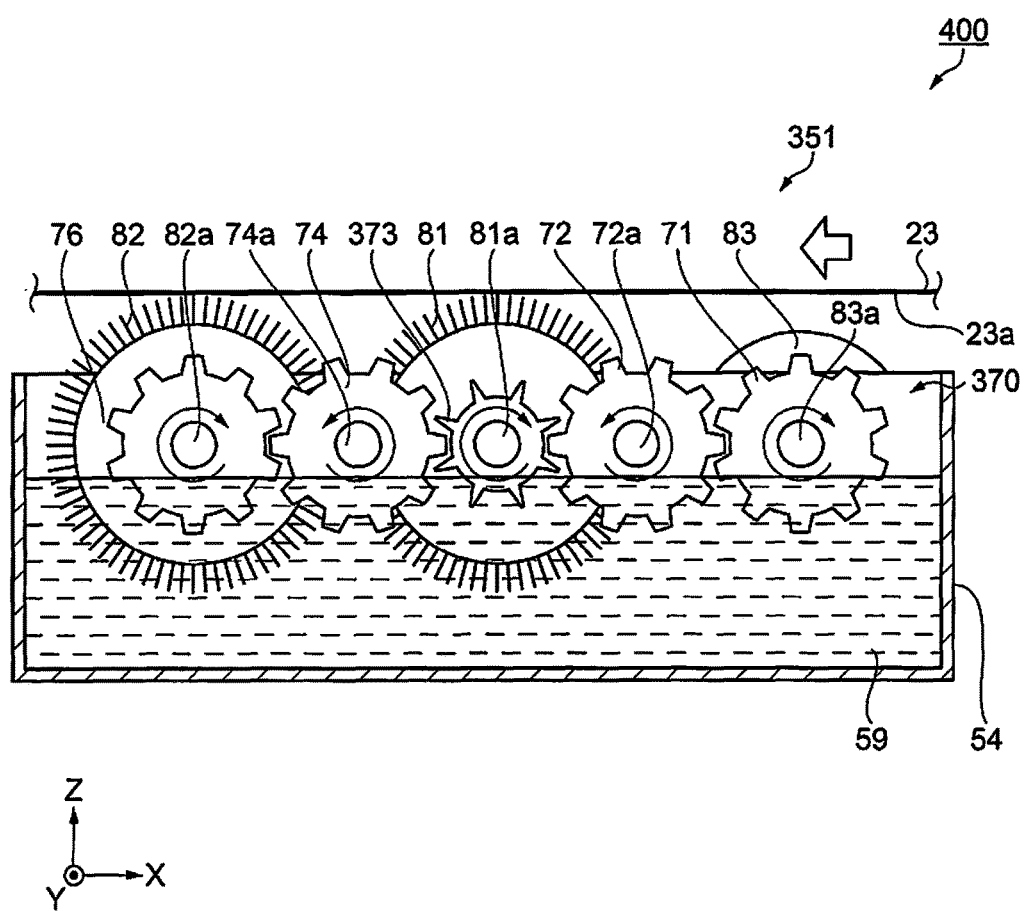
FIG. 10 is a cross-sectional view taken along line X-X in FIG. 9.

FIG. 9 is a plan view illustrating a configuration of a cleaning portion according to Embodiment 4. FIG. 10 is a cross-sectional view taken along line X-X in FIG. 9. With reference to FIG. 9 and FIG. 10, a printing apparatus 400 of the embodiment will be described. For the same components as in Embodiment 1, the same number is used, and a duplicate description thereof will be omitted. In addition, in FIG. 10, a rotating direction of each of gears 71, 72, 373, 74, and 76 is indicated by an arrow.

As shown in FIG. 9 and FIG. 10, the cleaning portion 351 includes a driving connection portion 370 that transfers the rotational driving force of the driving motor 83 to the first cleaning brush 81 and the second cleaning brush 82.

At least one of the driven gears 76 and 373 which are provided in the plurality of cleaning brushes (first cleaning brush 81 and second cleaning brush 82) have a different number of teeth from each other. According to the embodiment, the number of the teeth of the driven gear 373 which is provided in the first cleaning brush 81 is different from the number of the teeth of the driven gear 76 which is provided in the second cleaning brush 82.

The driven gear 373 has eight teeth and the driven gear 76 has 10 teeth. The driving gear 71 which is provided in the driving motor 83 has ten teeth. For example, in a case where the driving gear 71 rotates four times, the driven gear 373 rotates five times and since the driven gear 76 rotates four times, the first cleaning brush 81 and the second cleaning brush 82 can be rotated at different rotational speeds.

The number of the teeth of the driven gears 373 and 76 and the driving gear 71 described in the embodiment is an example and it is not limited to this.

In addition, in the embodiment, although the printing apparatus 400 in which the two cleaning brushes (first cleaning brush 81 and second cleaning brush 82) are included is described as an example, the printing apparatus may include at least three cleaning brush.

As described above, according to the printing apparatus 400 related to the embodiment, the following effects can be obtained.

Since the number of the teeth of the driven gear 373 which is provided in the first cleaning brush 81 is different from the number of the teeth of the driven gear 76 which is provided in the second cleaning brush 82, the first cleaning brush 81 and the second cleaning brush 82 can be rotated with different rotational speeds from each other. Accordingly, the transport belt 23 can be suitably cleaned.

This application claims priority under 35 U.S.C. § 119 to Japanese Patent Application No. 2016-038650, filed Mar. 1, 2016. The entire disclosure of Japanese Patent Application No. 2016-038650 is hereby incorporated herein by reference.

What is claimed is:

1. A printing apparatus, comprising:
    a transport belt which transports a printing medium in a transport direction;
    a cleaning tank which stores cleaning liquid;
    a cleaning brush which is contained in the cleaning tank and cleans the transport belt; and
    a driving motor which drives to rotate the cleaning brush,
    wherein the cleaning brush is driven to be rotated via a plurality of gears including a driving gear which is provided in the driving motor and a driven gear which is provided in the cleaning brush, and
    the driving motor has a main body and a driving shaft, with the main body being provided in an outside of the cleaning tank, and a distal end of the driving shaft extending in an inner portion of the cleaning tank.

2. The printing apparatus according to claim 1,
    wherein a center shaft of the driven gear is supported at an upper side of the center shaft of a gear meshing with the driven gear in a vertical direction.

3. The printing apparatus according to claim 1,
    wherein the cleaning brush is one of a plurality of cleaning brushes and the plurality of cleaning brushes are provided along a moving direction of the transport belt,
    the apparatus further comprising:
    an idler gear provided between the cleaning brushes which are adjacent to each other.

4. The printing apparatus according to claim 3,
wherein at least one of the driven gears which are provided in the plurality of cleaning brushes has a different number of teeth from each other.

5. The printing apparatus according to claim 3,
wherein the driven gears of the cleaning brushes which are adjacent to each other are connected via an odd number of idler gears.

6. The printing apparatus according to claim 3,
wherein the driven gears of the cleaning brushes which are adjacent to each other are connected via an even number of idler gears.

7. The printing apparatus according to claim 1,
wherein the cleaning tank has a projecting portion that projects to the upstream side of the transport direction, and the distal end of the driving shaft extends in an inner portion of the projecting portion.

* * * * *